April 9, 1929.  L. W. AFF  1,708,405
LATHE
Filed May 31, 1927  4 Sheets-Sheet 1

INVENTOR.
Louis W. Aff
BY
Townsend Loftus & Abbett
ATTORNEYS.

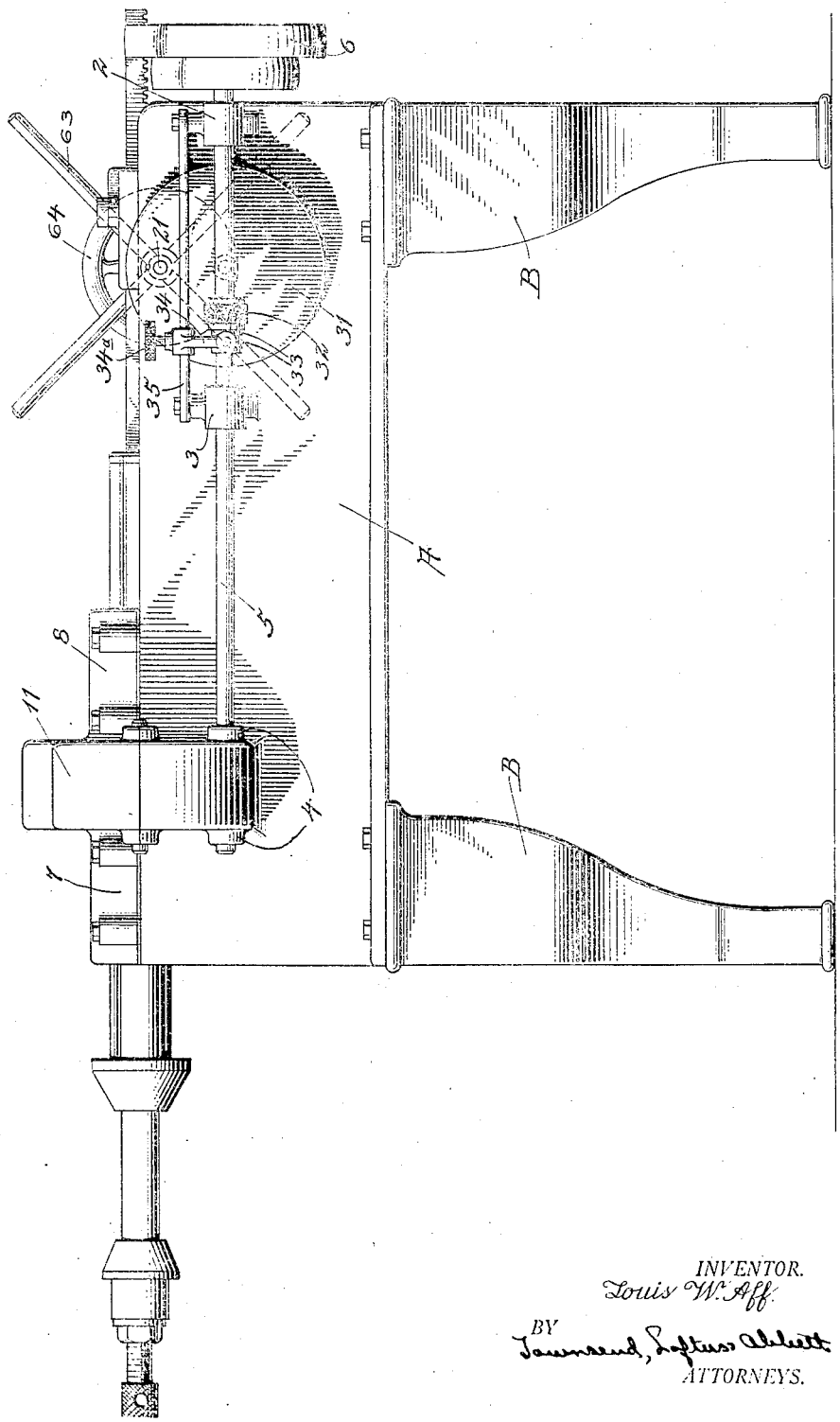

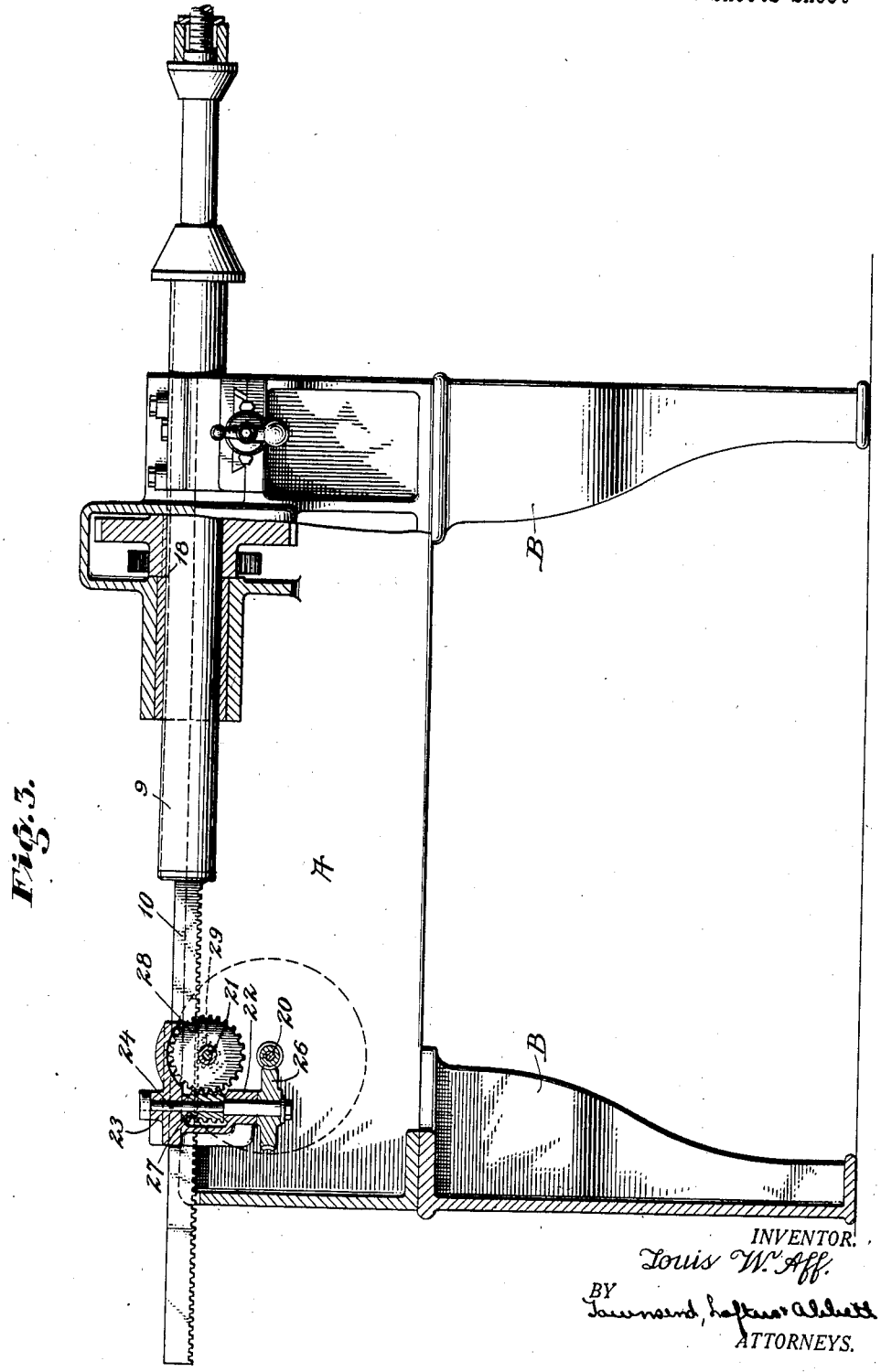

April 9, 1929.  L. W. AFF  1,708,405
LATHE
Filed May 31, 1927  4 Sheets-Sheet 4

INVENTOR.
Louis W. Aff
BY
Townsend, Loftus & Abbett
ATTORNEYS.

Patented Apr. 9, 1929.

1,708,405

UNITED STATES PATENT OFFICE.

LOUIS W. AFF, OF SAN FRANCISCO, CALIFORNIA

LATHE.

Application filed May 31, 1927. Serial No. 195,221.

This invention relates to a lathe and particularly to a lathe which is especially constructed and adapted for turning or trueing brake drums.

The object of the present invention is to generally improve and simplify the construction and operation of lathes of the character described, to provide a lathe which is adapted to receive a wheel with a brake drum attached thereto so that the drum may be turned without removal from the wheel, to provide means whereby the hub or bearing of the wheel may be centered with relation to the spindle of the lathe so that the brake drum when turned may be true and concentric with relation to the wheel and bearings, to provide means whereby the wheel and brake drum is rotated and advanced during the turning operation so that a stationary cutting tool may be employed, and further to provide means whereby the wheel and brake drum may be automatically advanced at variable speeds during the turning operation.

The lathe is shown by way of illustration in the accompanying drawings in which:

Fig. 2 is a side elevation of the lathe.

Fig. 3 is a partial vertical longitudinal section of the lathe.

Figure 1:
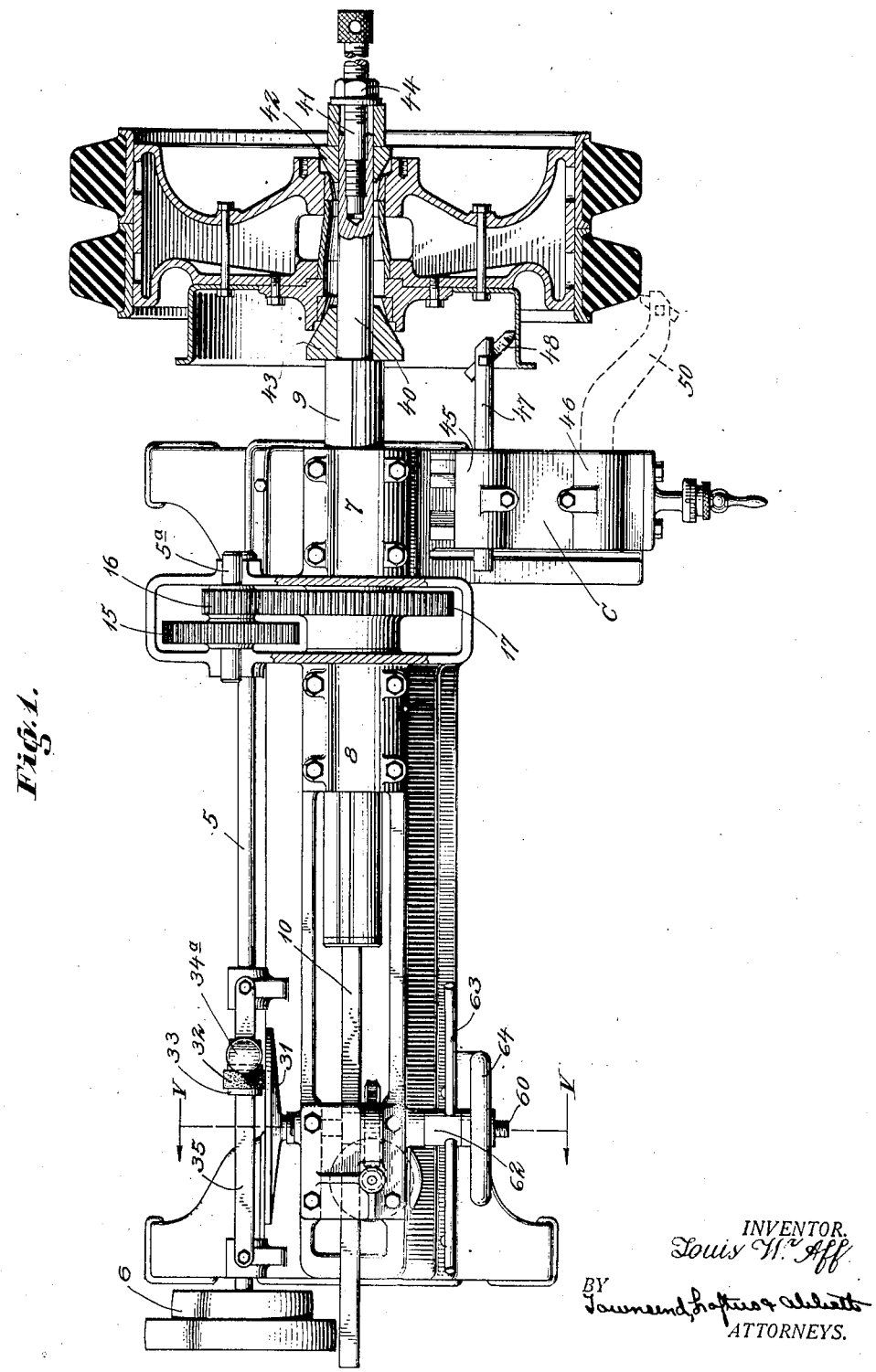
Fig. 1 is a plan view of the lathe said view showing an automobile wheel and brake drum in section and in position to be turned by the lathe.

Referring to the drawings in detail and particularly Figs. 1 and 2, A indicates the bed or main frame of a lathe and B the supporting legs. Formed on one side of the bed are a plurality of bearing members generally indicated at 2, 3 and 4, and journalled therein is a drive shaft 5 which may be driven in any suitable manner, for instance, by pulleys such as shown at 6. Formed on top of the bed or main frame A centrally thereof and at one end are a pair of interspaced bearing members 7 and 8 and journalled in said bearing members is a spindle 9 to one end of which is secured a feed rack 10. Formed intermediate the bearing members 7 and 8 is a gear housing or casing 11 and journalled in the gear housing at one side thereof at a point above the drive shaft 5 is an intermediate shaft 5ª. Secured on the drive shaft 5 at a point intermediate the bearings 4 is a driving pinion 14 of the spur-gear type. Secured on the intermediate shaft 5 are a pair of spur-gears 15 and 16 and splined to the spindle 9 is a spur-gear 17. The driving pinion 14 intermeshes with the gear 15, while the gear 16 intermeshes with the gear 17. A reduction drive is thus obtained between the shaft 5 and the spindle 9 and as a spline or driving connection, such as shown at 18, is formed between the gear 17 and the spindle 9, rotary movement will be imparted to the spindle and the spindle will at the same time be free to permit longitudinal movement thereof in the bearings 7 and 8 through means of the feed rack 10, as will hereinafter be described.

Journalled cross-wise of the bed or main frame A at a point adjacent the rear end thereof are a pair of shafts 20 and 21 and positioned rearwardly of these shafts and journalled in bearings 22 and 23 is a vertically disposed shaft 24. Secured on the shaft 20 is a worm pinion 25. This intermeshes with a worm gear 26 which is secured on the vertical shaft 24. Also secured on the vertical shaft 24 is a worm pinion 27, which meshes with a worm gear 28 secured on the shaft 21. The shaft 21 in addition to carrying the worm gear 28 carries a spurgear pinion 29 and this is so positioned as to intermesh with a feed rack 10. Secured on one end of the shaft 20 is a friction disc 31 and splined to the drive shaft at a point intermediate the bearings 2 and 3 is a friction driving wheel 32. One end of the wheel 32 is provided with a grooved collar 33. This is engaged by a fork 34 which is slidably mounted on a rod 35. The friction driving wheel 32 may be moved by means of the fork to or away from the center of the friction disc 31 and to either side thereof and a forward or a reverse movement at variable speeds may accordingly be transmitted to the shaft 20. The shaft 20 in turn drives the shaft 21 through the reduction worm gear train illustrated in Fig. 3 and as shaft 21 also carries a spur-gear pinion which meshes with the feed bar 10, it is obvious that the spindle may be moved longitudinally in its bearings 7 and 8 either in a forward or a reverse direction at substantially any speed desired. The fork 34 is provided with a clamp screw 34ª, which engages the rod 35 and the fork, together with the driving friction wheel 31, may accordingly be adjusted and secured at any point desired between the center and the periphery of the friction disc 31 and at either side thereof.

Figure 6:
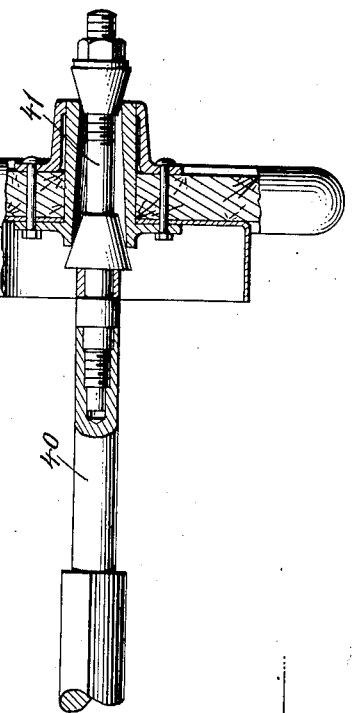
Fig. 6 is an enlarged detail sectional view of an extension spindle arbor.
Figure 4:
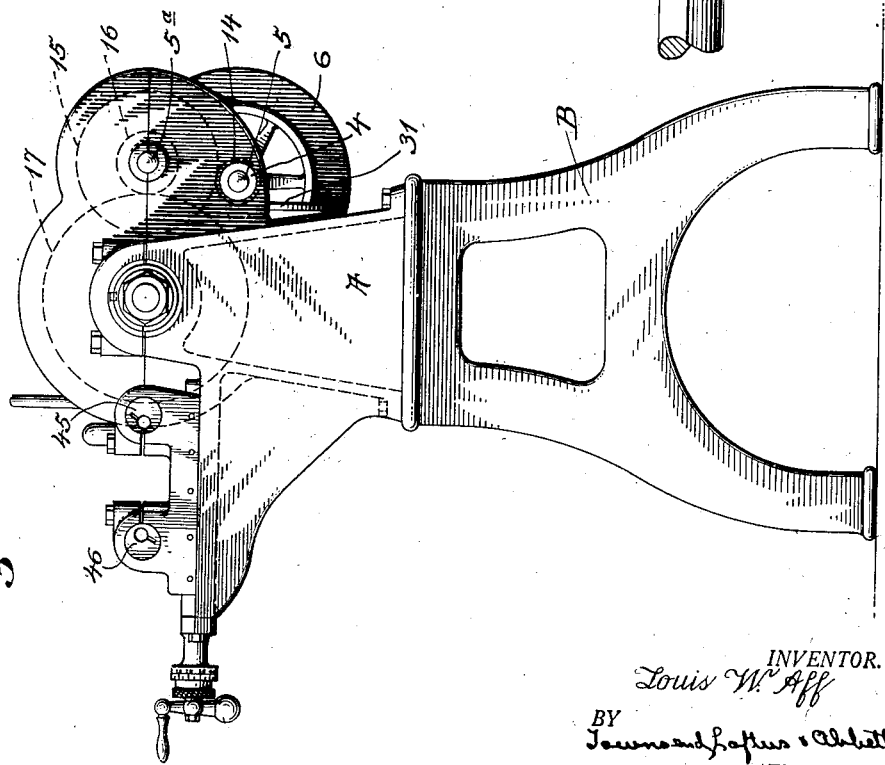
Fig. 4 is a front end view of the lathe.

One of the particular features of the present invention is that of turning the brake drum of an automobile wheel without removing the drum from the wheel and as this is the case it is more or less obvious that the wheel, together with the drum, must be placed in the lathe when the drum is to be turned. Another feature of the invention is that of centering the hub or bearing of the wheel with relation to the spindle of the lathe so that the drum will be turned true and concentric to the wheel bearing. The wheel and the drum is in this instance supported and directly attached to the forward end of the spindle 9, as shown in Fig. 1. This is accomplished by providing an arbor-like extension 40 on the spindle and in some instances by providing an auxiliary arbor extension, generally indicated at 41 (see Figs. 1 and 6) the auxiliary extensions being particularly employed when smaller wheels and brake drums are being turned, while the main arbor 40 is usually employed in conjunction with large wheels and drums. In order to truly center the hub of the wheel with relation to the arbor, centering cones, such as shown at 42 and 43, are employed. These cones engage opposite ends of the wheel hub or bearing and they are drawn tightly into place by means of a clamping nut or the like, such as indicated at 44. The cones, together with the clamping nut, center the wheel and drum and also secure the wheel and drum to the spindle while the turning operation is taking place. The drum may be turned on its inner or exterior surface or both, as the case may be. An ordinary cross-feed carriage, such as indicated at C, is employed. The carriage is in this instance provided with two tool posts, such as indicated at 45 and 46. If the drum on the wheel is to be turned on its inner surface, an ordinary cutter bar, such as shown at 47, is inserted in the tool post 45, and the cutting tool 48 is then placed in the outer end of the bar. The carriage C is then adjusted to or away from the spindle 9 to adjust the depth of the cut and it is then permitted to remain stationary during the cutting operation as the spindle 9, together with the work supported thereby, is not only rotated through means of the gears indicated at 14, 15, 16 and 17, but the spindle is also automatically advanced through means of the friction drive and the worm gear train and feed rack actuated thereby, the advance feed being controlled by the position of the friction driving wheel 32 with relation to the center of the disc, 31. For instance, a fairly fast advance may be desired with the first cut and a fairly slow advance with the finishing cuts, so as to obtain a smooth and finished surface. A rapid retractive movement may be obtained in all instances by manually operated means hereinafter to be described.

The lathe may also be employed for cutting grooves in the face of the rubber tires. If that is the case, a cutting bar, such as shown by dotted lines at 15, may be employed. This will be inserted in the second or outermost tool post 46 and grooves may accordingly be cut to any depth desired in the face of the tires, the friction feed, to-wit: the disc 31 and the driving roller 32 being in that instance set at the central or neutral point so that no advance of the spindle and wheel takes place while the grooves are being cut.

Figure 5:
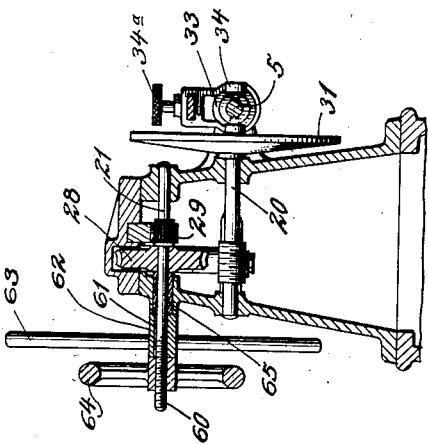
Fig. 5 is a cross-section of the lathe taken on line V—V, Fig. 1.

By referring to Fig. 5 it will be noted that the worm gear 28 is free or turnably mounted on the shaft 21 while the spur pinion 29 is keyed or otherwise secured thereto. This is important as it is desirable to employ a friction drive between the gears 28 and 29. This is accomplished as follows:

One end of the shaft 21 is threaded, as shown at 60, and it is also provided with a keyway to receive a key member 61 carried by a hub 62 which is provided with hand spokes 63, so that it may be manually turned. Mounted exterior of the spoked hub 61 is is a hand wheel 64 which is interiorly threaded to engage the threads 60 on the shaft 21 and interposed between the gear 28 and the hub 61 is a sleeve or bushing 65 which is freely movable longitudinally in the bearing supporting the same. The operation will be as follows:

If a cut has been completed by the cutting tool 48 and it is desired to quickly return the spindle 9, it is only necessary to grasp the spokes 63 of the hub member 62 and rotate the same to the left. This causes rotation of the shaft 21 and the spur pinion 29 and as this engages the feed bar 10, the feed bar, together with the spindle and the work supported thereby, will be quickly retracted. The gear 28, due to the fact that it is a worm gear, cannot rotate under such conditions and slippage will accordingly take place between the gears 28 and 29, such slippage being permitted as the hand wheel 64 will be slightly slackened. When a new cut is started, hand wheel 64 is again tightened. This exerts a pressure on the hub 61 and the sleeve 65 and as this engages to the face of the gear 28, the gear 28 will be moved longitudinally on the shaft 21 into frictional engagement with the gear 29, thus permitting the friction feed drive to actuate the feed bar during the next cut. The frictional engagement between the gears 28 and 29 is of further importance as it permits slippage to take place if the cutting tool reaches the end of its cut before the attention of the operator is attracted, thus obviating any damage to the cutting tool or the lathe as a whole.

While certain features of the invention are more or less specifically described and indicated, I wish it understood that various changes may be resorted to within the scope of the appended claims; similarly, that the materials and finish of the several parts employed may be such as the manufacturer may dictate or varying conditions or uses may demand.

What I claim and desire to secure by Letters Patent is:

1. In a machine of the character described a main frame, a spindle journalled therein having a free end thereof projecting from the main frame, means to secure and center an object on the free end of the spindle, a drive shaft, a variable speed transmission mechanism supported by the frame, a friction drive between said transmission and the drive shaft, a feed bar connected with the spindle and means whereby longitudinal movement is transmitted to the feed bar and the spindle through the variable speed transmission mechanism.

2. In a machine of the character described a main frame, a spindle journalled therein having a free end thereof projecting from the main frame, means to secure and center an object on the free end of the spindle, a drive shaft, a variable speed transmission mechanism supported by the frame, a friction drive between said transmission and the drive shaft, a feed bar connected with the spindle, means whereby longitudinal movement is transmitted to the feed bar and the spindle through the variable speed transmission mechanism and a manually operated means operatable independent of the variable speed transmission mechanism for imparting longitudinal movement to the feed bar and spindle.

3. In a machine of the character described a main frame, a spindle journalled therein, having a free end thereof projecting from the main frame, means to secure and center an object on the free end of the spindle, a drive shaft, a cross-shaft journal on the frame, a friction disc secured on one end of the cross-shaft, a friction driving wheel splined on the drive shaft and adjustable radially of the disc to impart a variable speed drive to the disc and the cross-shaft, a feed bar attached to the spindle, and a driving connection formed between the feed bar and the cross-shaft whereby longitudinal movement is imparted to the feed bar and the spindle.

4. In a machine of the character described a main frame, a spindle journalled therein having a free end thereof projecting from the main frame, means to secure and center an object on the free end of the spindle, a drive shaft, a cross-shaft journal on the frame, a friction disc secured on one end of the cross-shaft, a friction driving wheel splined on the drive shaft and adjustable radially of the disc to impart a variable speed drive to the disc and the cross-shaft, a feed bar attached to the spindle, a second cross-shaft journalled in the frame, a gear pinion secured on said second cross-shaft and intermeshing with teeth formed on the feed bar, a second gear mounted on the second cross-shaft and freely turnable thereon, means whereby power is transmitted from the cross-shaft to rotate said second named gear, and means whereby said second named gear may be clutched to the second named cross-shaft to rotate the same.

5. In a machine of the character described a main frame, a spindle journalled therein having a free end thereof projecting from the main frame, means to secure and center an object on the free end of the spindle, a drive shaft, a cross-shaft journal on the frame, a friction disc secured on one end of the cross-shaft, a friction driving wheel splined on the drive shaft and adjustable radially of the disc to impart a variable speed drive to the disc and the cross-shaft, a feed bar attached to the spindle, a second cross-shaft journalled in the frame, a gear pinion secured on said second cross-shaft and intermeshing with teeth formed on the feed bar, a second gear mounted on the second cross-shaft and freely turnable thereon, means whereby power is transmitted from the cross-shaft to rotate said second named gear, means whereby said second named gear may be clutched to the second named cross-shaft to rotate the same, and other means connected with the second named cross-shaft for rotating the same manually and independently of the second named gear.

6. A machine of the character described comprising a main frame, a spindle journalled in the main frame having a free end projecting therefrom, means on the free end of the spindle for securing and centering the assembled wheel upon which the brake drum to be turned is mounted, a cutting tool, a drive shaft journalled in the main frame, means whereby rotary movement is transmitted to the drive shaft from the spindle, a variable speed transmission driven by the drive shaft, and means whereby longitudinal movement is transmitted to the spindle through the various speed transmission mechanisms.

LOUIS W. AFF.